United States Patent
Yu

(10) Patent No.: US 10,070,442 B2
(45) Date of Patent: Sep. 4, 2018

(54) WIRELESS COMMUNICATION SYSTEM, AND METHOD FOR CONNECTING RRC FOR CONTROLLING OVERLOADS IN WIRELESS COMMUNICATION SYSTEM

(71) Applicant: Samsung Electronics Co., Ltd., Gyeonggi-do (KR)

(72) Inventor: Su Jung Yu, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/369,181

(22) PCT Filed: Dec. 26, 2012

(86) PCT No.: PCT/KR2012/011492
§ 371 (c)(1),
(2) Date: Jun. 26, 2014

(87) PCT Pub. No.: WO2013/100582
PCT Pub. Date: Jul. 4, 2013

(65) Prior Publication Data
US 2014/0378155 A1 Dec. 25, 2014

(30) Foreign Application Priority Data
Dec. 26, 2011 (KR) .................. 10-2011-0141877

(51) Int. Cl.
*H04W 48/06* (2009.01)
*H04W 72/10* (2009.01)
(Continued)

(52) U.S. Cl.
CPC ... *H04W 72/0486* (2013.01); *H04W 28/0205* (2013.01); *H04W 28/0289* (2013.01); *H04W 48/06* (2013.01); *H04W 72/10* (2013.01)

(58) Field of Classification Search
CPC ............. H04B 1/04; H04B 2001/0416; H04W 28/0205; H04W 28/0289; H04W 72/0486; H04W 72/10; Y02B 60/50
See application file for complete search history.

(56) References Cited

U.S. PATENT DOCUMENTS 6,668,175 B1 * 12/2003 Almgren ................. H04L 47/14
455/516
2006/0040671 A1 * 2/2006 Takarabe .............. H04W 72/06
455/450

(Continued)

FOREIGN PATENT DOCUMENTS

| KR | 10-2009-0111433 | 10/2009 |
| KR | 10-2011-0135864 | 12/2011 |

OTHER PUBLICATIONS

International Search Report dated Apr. 16, 2013 in connection with International Patent Application No. PCT/KR2012/011492, 5 pages.
(Continued)

*Primary Examiner* — Frantz Bataille

(57) ABSTRACT

The present disclosure relates to a wireless communication system and to a method for connecting RRC for controlling overloads in the wireless communication system. The method includes the steps of: a mobile signal processing unit transferring an overload control message including preference priority information for overload control to a base station; the base station storing the preference priority information and receiving an RRC connection request message including service information for performing a service from a UE; the base station determining whether the service information is included in the preference priority information when receiving the RRC connection request message; and the base station transmitting an RRC connection allowance message to the UE when the service information is included in the preference priority information. Accordingly,
(Continued)

the base station can efficiently control the overload for each service performed in the UE.

10 Claims, 9 Drawing Sheets

(51) Int. Cl.
*H04W 72/04* (2009.01)
*H04W 28/02* (2009.01)

(56) References Cited

U.S. PATENT DOCUMENTS

| | | | | |
|---|---|---|---|---|
| 2007/0238454 A1* | 10/2007 | Chambers | ............ | H04W 68/00 455/422.1 |
| 2010/0105401 A1* | 4/2010 | Chun et al. | .................. | 455/450 |
| 2010/0222023 A1* | 9/2010 | Aoyama | ............. | H04W 76/021 455/411 |
| 2011/0013589 A1* | 1/2011 | Wu | ....................... | H04W 72/10 370/331 |
| 2012/0314569 A1* | 12/2012 | Liu | .................. | H04W 36/0094 370/230 |

OTHER PUBLICATIONS

Written Opinion of International Searching Authority dated Apr. 16, 2013 in connection with International Patent Application No. PCT/KR2012/007947, 4 pages.

Ce Liu, et al., "The Research of RRC Connection Establishment and Co-Simulation of SDL and TTCN", IEEE Computing Control and Industrial Engineering, 2011 IEEE 2nd International Conference, Chongqing, China, Aug. 2011, pp. 216-219.

3GPP TR 23.888 V0.5.1, "3rd Generation Partnership Project; Technical Specification Group Services and System Aspects; System Improvements for Machine-Type Communications (Release 10)", Jul. 2010, 75 pages.

* cited by examiner

FIG. 2

| | delay tolerant | mo-data | mo-signalling | high Priority Access | mt-access | emergency |
|---|---|---|---|---|---|---|
| | 210 | 220 | 230 | 240 | 250 | 260 |
| Message Type 1 | Reject | Permit | Permit | Permit | Permit | Permit |
| Message Type 2 | Reject | Reject | Permit | Permit | Permit | Permit |
| Message Type 3 | Reject | Reject | Reject | Reject | Permit | Permit |
| Message Type 4 | Reject | Reject | Reject | Permit | Permit | Reject |
| Message Type 5 | Reject | Permit | Permit | Permit | Permit | Permit |

WIRELESS COMMUNICATION SYSTEM, AND METHOD FOR CONNECTING RRC FOR CONTROLLING OVERLOADS IN WIRELESS COMMUNICATION SYSTEM

CROSS-REFERENCE TO RELATED APPLICATION(S)

The present application claims priority under 35 U.S.C. § 365 to International Patent Application No. PCT/KR2012/011492 filed Dec. 26, 2012, entitled "s WIRELESS COMMUNICATION SYSTEM, AND METHOD FOR CONNECTING RRC FOR CONTROLLING OVERLOADS IN WIRELESS COMMUNICATION SYSTEM". International Patent Application No. PCT/KR2012/011492 claims priority under 35 U.S.C. § 365 and/or 35 U.S.C. § 119(a) to Korean Patent Application No. 10-2011-0141877 filed Dec. 26, 2011, both of which are incorporated herein by reference into the present disclosure as if fully set forth herein.

TECHNICAL FIELD

The present disclosure relates to a wireless communication system and an RRC connection method for overload control in the wireless communication and, in particular, to an RRC connection control method for a Mobile Signaling Implementation Function to control the RRC connection of a terminal in order to reduce overload occurring in association with a base station and a wireless communication for supporting the same.

BACKGROUND ART

In a mobile communication network, Mobile Signaling Implementation Function (MSIF) known as Mobility Management Entity (MME) can control overload in cooperation with the base station. At this time, the MSIF may control the overload using the Radio Resource Control (RRC) Establishment Cause transmitted from the base station to the terminal for a certain service.

FIG. 1 is a diagram illustrating a wireless communication system for controlling overload according to a conventional technology.

As shown in part <a> of FIG. 1, if overload caused by the service to the terminals, the MSIF sends the base stations overload start messages 310a and 310b for controlling overload along with its overload information and overload control information. Then the base stations perform overload control according to the message from the MSIF. If the overload is mitigated through the overload control procedure, the MSIF sends the base station an overload stop message 120 for terminating the overload control as shown in part <b> of FIG. 1.

FIG. 2 is a diagram illustrating a control message per overload rank according to the conventional technology.

Referring to FIG. 2, the overload control message may control to permit RRC connection in response to an RRC Connection Request message received from the terminal. In order to accomplish this, the overload control message includes configuration information indicating whether to permit or reject the RRC connection depending on the RRC Establishment Cause value included in the RRC Connection Request message. The RRC Establishment Cause value is the information on the service to be provided to the terminal.

As shown in FIG. 2, the RRC Establishment Cause value defines delay tolerant 210 for Machine Type Communication (MTC) terminal, mo-Data 220 for outgoing call service, mo-Signaling 230 for voice service provided due to Circuit Switching (SC) fallback, high Priority Access 240 for specific user, mt-Access 250 requesting for network for incoming call service, emergency 260 for emergency call service, etc.

DISCLOSURE OF INVENTION

Technical Problem

In the mobile communication network, the MSIF defines the overload control message per overload rank to control overload. However, as the communication services are diversified in line with the advance of the communication technology, it is necessary to redefine the per-rank overload control message. That is, although the CS voice overload control function (Extended Service Request and mo-signaling definition) is provided, there is no overload control function associated with VoIP (VoLTE) having high priority. Accordingly, even the high priority service may undergo overload in the system overload situation. There is therefore a need of defining a new overload control message for controlling the overload caused by the terminal request (e.g. mo-data) message and network request (e.g. mt-access) message.

In the following, the present disclosure proposes a wireless communication system and an RRC connection method for controlling overload in the wireless communication system.

Solution to Problem

In accordance with an aspect of the present disclosure, an RRC connection method of a wireless communication system includes transmitting, at a mobile signaling implementation function, an overload control message including preference priority information for controlling overload to a base station, storing, at the base station, the preference priority information and receiving an RRC connection request message including service information for performing service from a terminal, determining, at the base station when the RRC connection request message is received, whether the preference priority information includes the service information, and transmitting, when the service information is not included, an RRC connection accept message to the terminal.

Preferably, the transmitting of the overload control message includes determining whether overload control is necessary based on the RRC connection request message transmitted by the terminal via the base station and generating, when the overload control is necessary, permitted priority informations for individual services provided to the terminal.

Preferably, the generating of the permitted priority informations comprises sorting the services based on Allocation and Retention Priority (ARP) values.

Preferably, the generating of the permitted priority informations includes determining priority of a specific Non-Access Stratum (NAS) signaling from the terminal.

In accordance with another aspect of the present disclosure, an RRC connection system includes a mobile signaling implementation function which transmits an overload control message including preference priority information for controlling overload to a base station and a base station which stores, at the base station, the preference priority information, receives an RRC connection request message including service information for performing service from a terminal, determines, at the base station when the RRC connection request message is received, whether the preference priority information includes the service information, and transmits, when the service information is not included, an RRC connection accept message to the terminal.

Preferably, the mobile signaling implementation function determines whether overload control is necessary based on the RRC connection request message transmitted by the terminal via the base station and generates, when the overload control is necessary, permitted priority informations for individual services provided to the terminal.

Preferably, the mobile signaling implementation function sorts the services based on Allocation and Retention Priority (ARP) values to generate the permitted priority information.

Preferably, the mobile signaling implementation function determines priority of a specific Non-Access Stratum (NAS) signaling from the terminal to generate the permitted priority information.

Advantageous Effects of Invention

The RRC connection control method of the present disclosure defines the control function for controlling overload associated with the interworking between the MSIF and base station efficiently so as to increase per-service overload control efficiency. The RRC connection control method of the present disclosure is advantageous in terms of defining NAS signaling for VoLTE in the mobile communication network and RRC Establishment for overload control per priority. Also, the RRC connection control method of the present disclosure is advantageous in terms of efficient overload control per service in association with the interworking overload between MSIF and base station through the overload control mechanism based on Allocation and Retention Priority (ARP) for per-service overload control.

BRIEF DESCRIPTION OF DRAWINGS

FIG. 2 is a diagram illustrating a control message per overload rank according to the conventional technology.

MODE FOR THE INVENTION

Exemplary embodiments of the present disclosure are described with reference to the accompanying drawings in detail. Detailed description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

A representative Mobile Signaling Implementation Function (MSIF) is Mobility Management Entity (MME) which manages connection of the terminal to the mobile communication network. The MSIF is responsible for authentication, security, and mobility management functions. The authentication function is of verifying normal connection of the terminal through authentication process in the initial attach attempt of the terminal. The security function is of providing encryption key and integrity protection key to provide the terminal with secure communication service. The mobility management function is of logging and tracking location of the terminal and changing the base station serving the terminal through handover procedure. Here, the MSIF may send the base station the overload control information for controlling the overload occurring when the terminal consumes the service.

Figure 1:
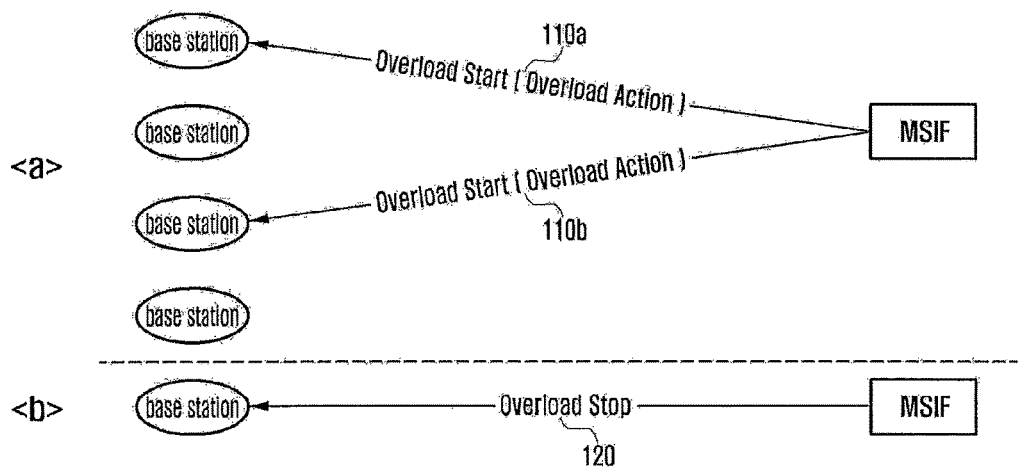
FIG. 1 is a diagram illustrating a wireless communication system for controlling overload according to a conventional technology.
Figure 3:
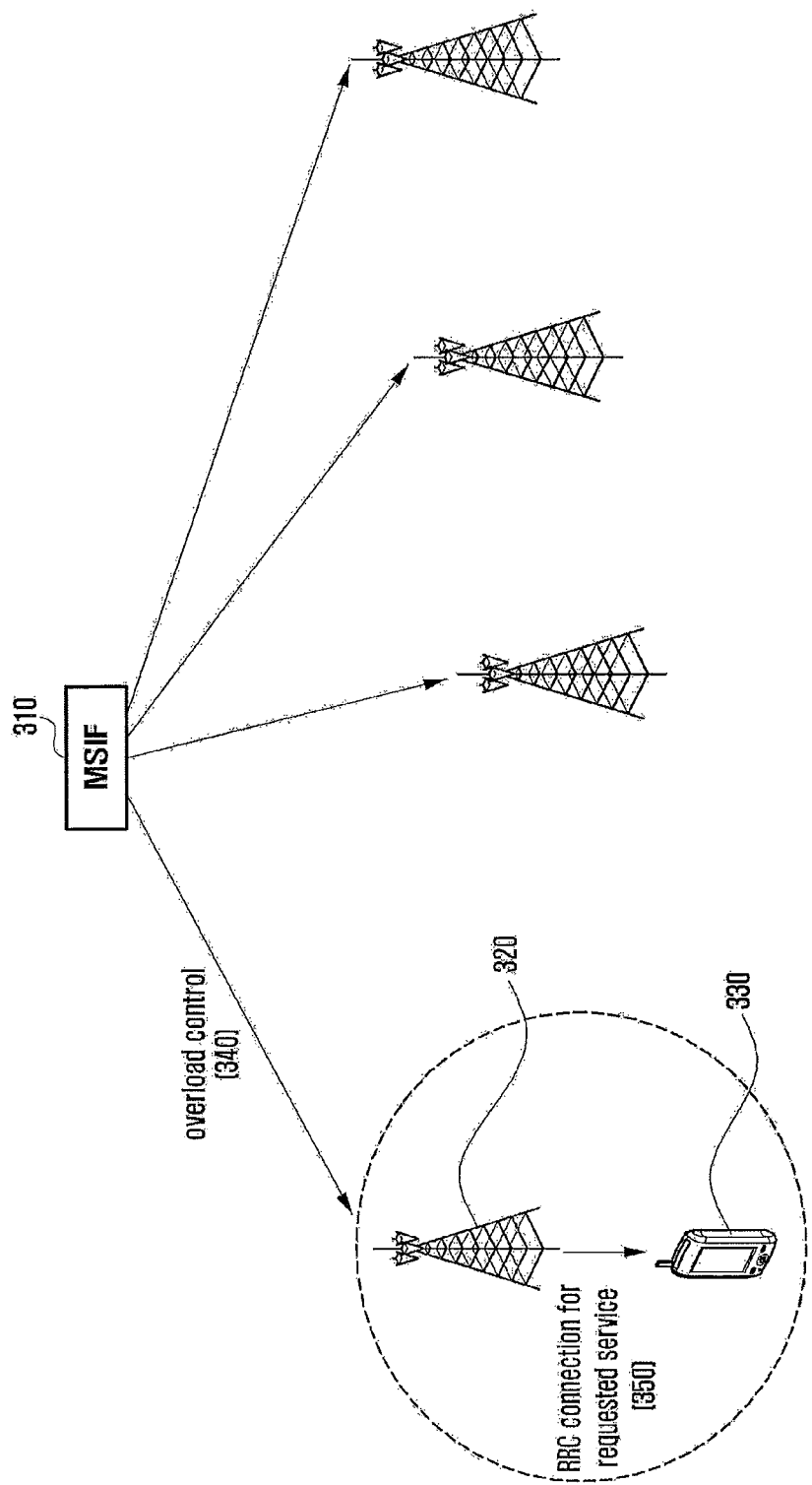
FIG. 3 is a diagram illustrating a wireless communication system for controlling overload according to an embodiment of the present disclosure.

FIG. 3 is a diagram illustrating a wireless communication system for controlling overload according to an embodiment of the present disclosure.

Referring to FIG. 3, the wireless communication system includes an MSIF 310 for defining per-service overload control scheme, base stations 320 for executing per-service overload control, and a terminal 320 with a USIM to request for services.

The MSIF 310 sends the base station 320 an overload start message as an overload control message including preference priority information for overload control as denoted by reference number 340. Then the base station 320 performs overload control according to the preference priority information received from the MSIF 310. That is, if a Radio Resource Control (RRC) connection request message for service execution is received from the terminal 330, the base station 320 checks the priority of the service requested by the terminal 330 based on the preference priority information. Then the base station establishes an RRC connection according to the check priority as denoted by reference number 350.

In order for the terminal 330 to control the RRC connection per service, the overload control message transmitted by the MSIF 310 includes permitted priority information. The permitted priority information denotes the information for use in controlling the base station to accept or reject the RRC connection depending on the service to be provided to the terminal and the priority. A description is made of the overload control message for overload control based on the permitted priority information later with reference to FIG. 6.

The terminal 300 sends an RRC connection request message requesting for the service selected by the user. The RRC connection request message also includes the service information, i.e. RRC Establishment Cause value indicating the selected service. The service information includes delay tolerant for Machine Type Communication (MTC) terminal, mo-Data for outgoing call service, mo-Signaling for voice service provided due to Circuit Switching (SC) fallback, high Priority Access for specific user, mt-Access requesting for network for incoming call service, emergency for emergency call service, etc.

Figure 4:
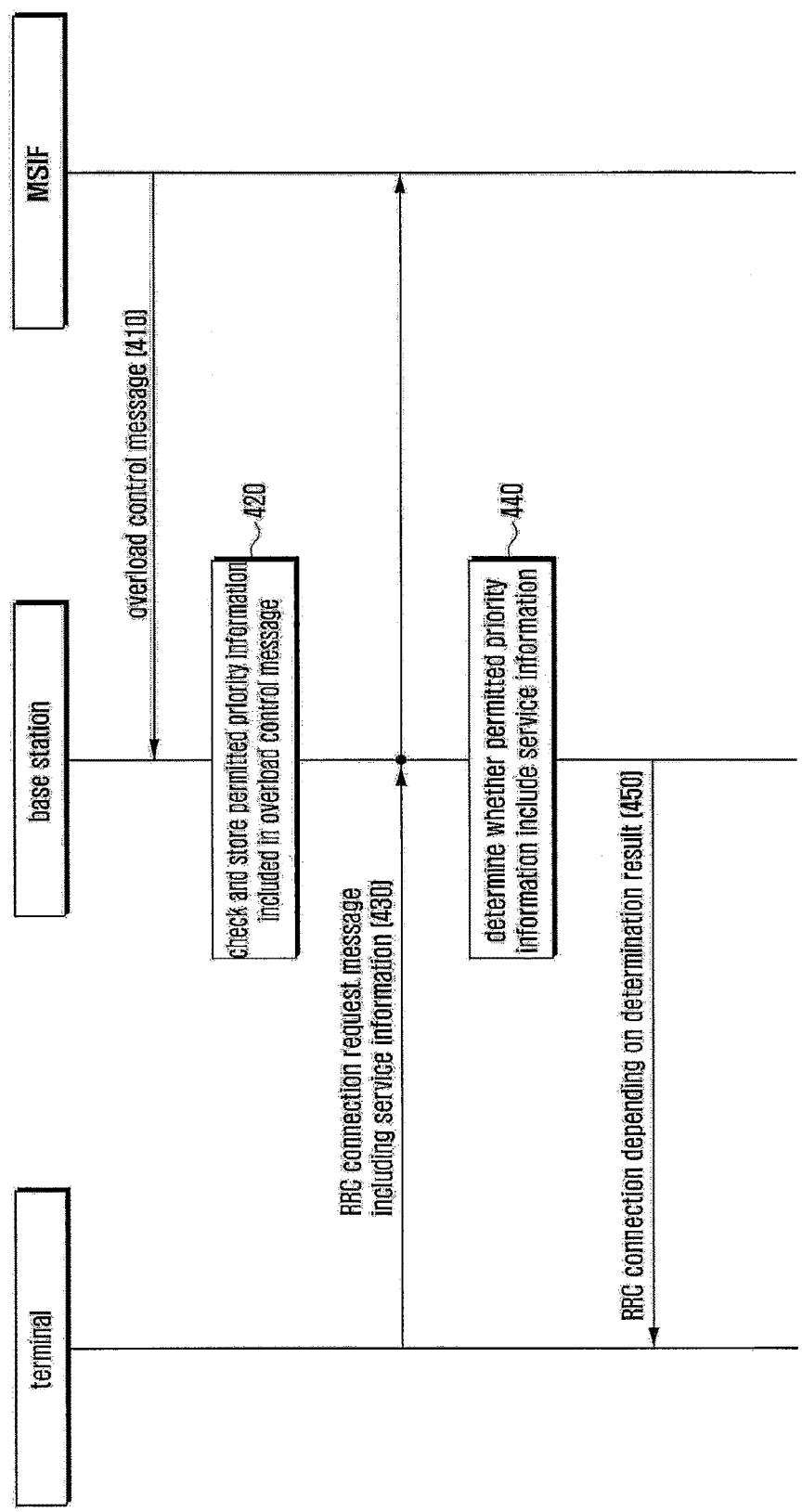
FIG. 4 is a signal flow diagram illustrating RRC connection procedure in the wireless communication system according to an embodiment of the present disclosure.

FIG. 4 is a signal flow diagram illustrating RRC connection procedure in the wireless communication system according to an embodiment of the present disclosure.

Referring to FIG. 4, if overload occurs in the terminal consuming the service, the MSIF sends the base station the overload control message, i.e. overload start message, at operation 410. At this time, the overload control message includes permitted priority information configured per service.

The base station checks the permitted priority information included in the overload control message and stores the checked permitted priority information at operation 520. Next, the base station determines whether an RRC connection request message to request for the service is transmitted from the terminal.

If the user selects the service, the terminal sends the base station an RRC connection request message including the information on the requested service at operation 430. Then the base station forwards the RRC connection request message to the MSIF.

The base station checks the service information included in the RRC connection request message at operation 440. The base station determines whether the checked service information matches the stored permitted priority information. Next, the base station establishes an RRC connection depending on the determination result at operation 450. If the service information matches the permitted priority information, the base station sends the terminal an RRC connection response message. Then an RRC connection is established for providing the service between the terminal and the base station.

Although not shown in the drawing, the base station performs the overload control until an overload stop message for terminating the overload control is received from the MSIF. Whenever the terminal requests for the service, the base station determines whether the requested service is available based on the permitted priority information.

Through this procedure, the base station is capable of performing overload control according to the priority per service requested by the terminal through the overload control message transmitted by the MSIF.

Figure 5:
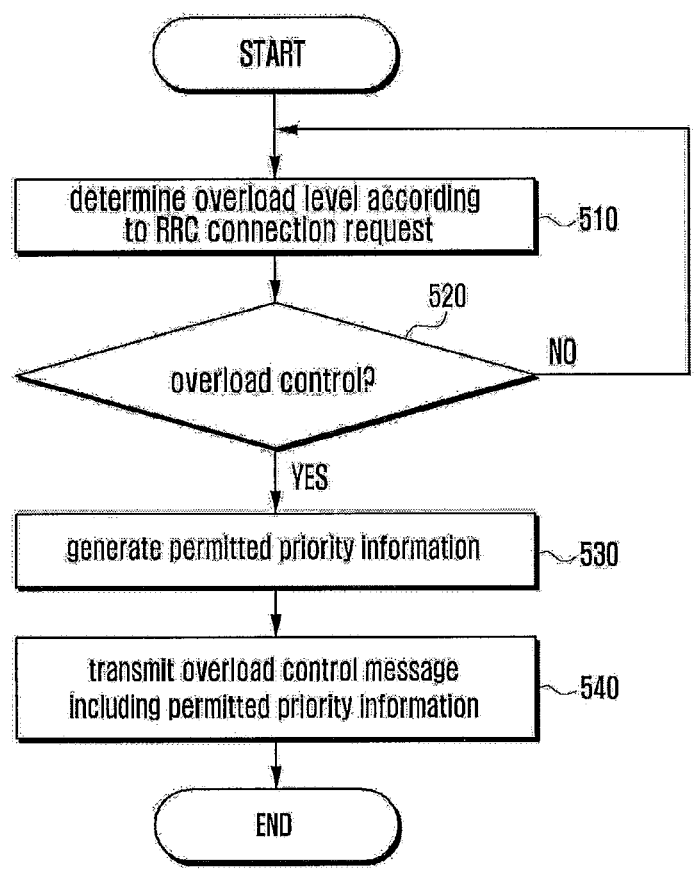
FIG. 5 is a flowchart illustrating the overload control procedure of the MSIF according to an embodiment of the present disclosure.

FIG. 5 is a flowchart illustrating the overload control procedure of the MSIF according to an embodiment of the present disclosure.

Referring to FIG. 5, the MSIF checks the overload level based on the RRC connection request transmitted by the terminal via the base station at operation 510. The MSIF determines whether overload control is necessary at operation 520. That is, the MSIF determines whether the overload level is equal to or greater than a preconfigured threshold value to make overload control decision in association with the service served to the terminal currently.

If the overload control is necessary, the MSIF checks the per-service permitted priority provided to the terminal to generate permitted priority information at operation 530. Then the MSIF sends the overload control message including the permitted priority information at operation 540. Although not shown in the drawing, the MSIF checks the overload level constantly. If the overload level drops to an extent of requiring the overload control no longer, the MSIF sends the base station an overload stop message for terminating the overload control.

The permitted priority information transmitted by the MSIF for overload control is the information for use in configuring priorities of individual services served to the terminal. This information is described in detail with reference to FIG. 6.

Figure 6:
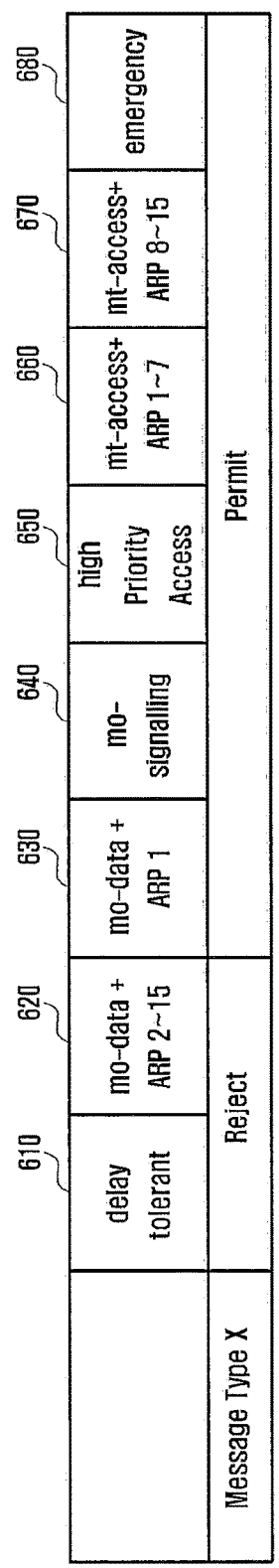
FIG. 6 is a diagram illustrating a per-rank overload control message per priority according to an embodiment of the present disclosure.

FIG. 6 is a diagram illustrating a per-rank overload control message per priority according to an embodiment of the present disclosure.

Referring to FIG. 6, the per-rank overload control message means the information includes permitted priority information. Here, the permitted priority information means the information including delay tolerant 610 for Machine Type Communication (MTC) terminal, mo-Data 620 for first preference outgoing call service, mo-Data 630 for second preference outgoing call service, mo-Signaling 640 for voice service provided due to Circuit Switching (SC) fallback, high Priority Access 650 for specific user, mt-Access 660 requesting for network for first preference incoming call service, mt-Access 670 requesting for network for second preference incoming call service, and emergency 680 for emergency call service, in an acceptable order thereof. That is, the permitted priority information is the information defining the NAS signaling and RRC Establishment Cause for providing VoLTE service in controlling overload.

In the present disclosure, the legacy mo-Data and mt-Access are subcategorized into mo-Data 620 for first preference outgoing call service and mo-Data 630 for second preference outgoing call service, mo-Signaling 640 for voice service provided due to Circuit Switching (SC) fallback, mt-Access 660 requesting for network for first preference incoming call service, and mt-Access 670 requesting for network for second preference incoming call service. Although mo-Data and mt-Access are described as the information for first preference outgoing call service, second preference outgoing call service, first preference incoming call service, and second preference incoming call service; the present disclosure is not limited thereto. For example, each of mo-Data and mt-Access is subcategorized into at least two items. That is, each of mo-Data and mt-Access may be subcategorized into the $1^{st}$ to $N^{th}$ preferences. The ARP also may be subcategorized in correspondence to the subcategorized preference items.

mo-Data and mt-Access are subcategorized by Allocation and Retention Priority (ARP) value per service. Here, ARP has a value selected in the range from 0 to 15 depending on the preemption capability and preemption vulnerability. For example, if the ARP value is high, the mo-Data may be defined to be controlled with priority in the overload control procedure. If the ARP value is low, the mt-Access may be defined to be controlled with priority in the overload control procedure.

In FIG. 6, referencing the mo-Data 620 for the first preference outgoing call service and the mo-Data 630 for the second preference outgoing call service, the ARP value of the mo-Data 620 for the first preference outgoing call service has the range of 2~15. Meanwhile, the ARP value of the mo-Data 630 for the second preference outgoing call service is set to 1. According to the preference priority information transmitted by the MSIF, the priority for RRC connection control is set in the order of the mo-Data 620 for the first preference outgoing call service and the mo-Data 630 for the second preference outgoing call service. It is assumed that when overload occurs the base station receives RRC connection request messages to request for mo-Data 620 for the first preference outgoing call service and mo-data 630 for the second preference outgoing call service. Then the base station may reject the connection of mo-Data 620 for the first preference outgoing call service and accept the connection of mo-Data 630 for the second preference outgoing call service.

The MSIF may determine the priority of a specific Non-Access Stratum (NAS) signaling and notify the base station of the determination result. At this time, the specific NAS signaling may be interposed between the high Priority Access 650 for a specific user and mt-Access 660 requesting for the network for the first preference incoming call service.

The specific NAS signaling is a message transmitted, when the terminal initiates VoLTE service, to request for use of the service. In more detail, the NAS signaling is the message exchanged between the terminal and the core network so as to be transmitted to the core network transparently of the base station. The IP Multimedia Subsystem (IMS) Service Request is one of the representative NAS messages. The parameters constituting the IMS Service Request include service type and Internal Mobile Subscriber Identity (IMSI). Here, the service type corresponds to IMS Indicator, and IMSI corresponds to User Equipment (UE) ID.

For example, if the user selects VoLTE service, the terminal sends the base station the RRC Establishment Cause including the NAS signaling. Then the base station checks whether the permitted priority information received from the MSIF includes priority. The base station may provide the terminal with the VoLTE service according to the checked priority.

Figure 7:
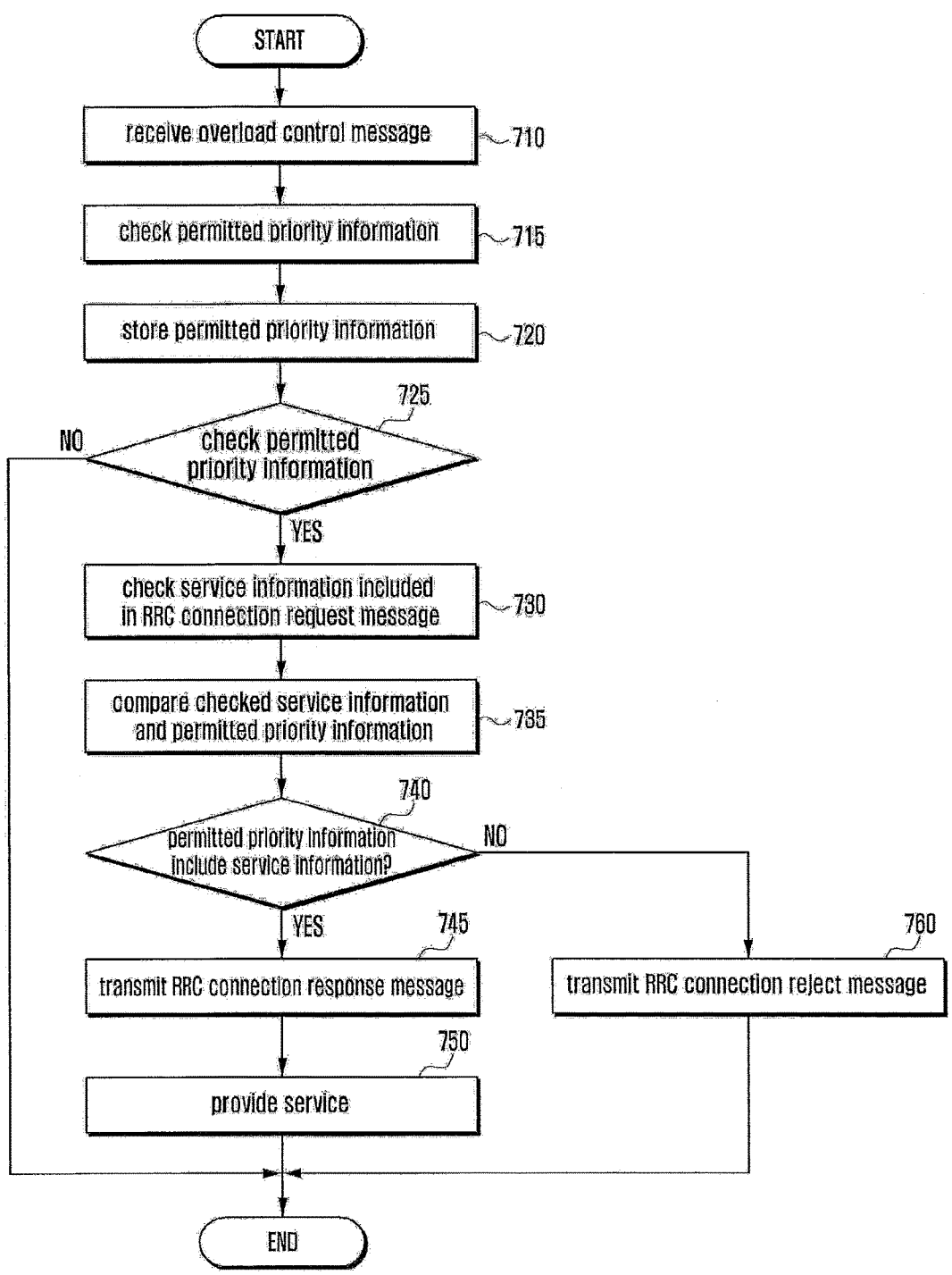
FIG. 7 is a flowchart illustrating an RRC connection procedure for overload control at the base station according to an embodiment of the present disclosure.

FIG. 7 is a flowchart illustrating an RRC connection procedure for overload control at the base station according to an embodiment of the present disclosure.

Referring to FIG. 7, the base station receives an overload control message, i.e. overload start message, from the MSIF at operation 710. Then the base station checks the permitted priority information included in the overload control message at operation 715. The base station stores the permitted priority information at operation 720.

The base station determines whether an RRC connection request message is received from the terminal at operation 725. If an RRC connection request message is received, the base station checks the service information included in the RRC connection request message at operation 730. The base station compares the checked service information and the stored permitted priority information at operation 735.

The base station determines whether the permitted priority service information includes the service information at operation 740. If the permitted priority information includes the service information, the base station sends the terminal an RRC connection response message at operation 745. Otherwise if the permitted priority information does include the service information, the base station sends the terminal an RRC connection reject message at operation 760.

Although not shown in the drawing, the base station determines whether an overload stop message for terminating the overload control is received from the MSIF in the state of performing overload control. If the overload stop message is received from the MSIF, the base station ends the overload control. If the RRC connection request message is received from the terminal, the base station forwards this message to the MSIF. Afterward, the base station provides the terminal with the service. The base station performs the overload control repeatedly according to the receipt of overload control messages, i.e. overload start and stop messages, from the MSIF.

Figure 8:
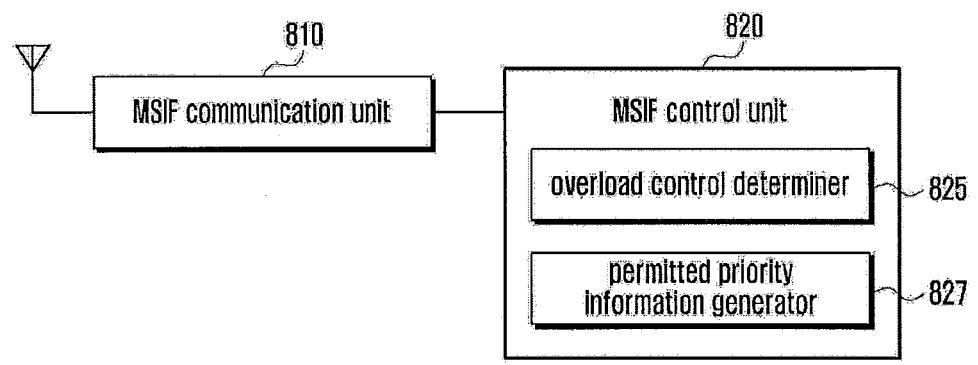
FIG. 8 is a block diagram illustrating a configuration of the MSIF according to an embodiment of the present disclosure.

FIG. 8 is a block diagram illustrating a configuration of the MSIF according to an embodiment of the present disclosure.

Referring to FIG. 8, the MSIF includes an MSIF communication unit 810 and an MSIF control unit 820.

The MSIF communication unit 810 receives an RRC connection request message transmitted by the terminal via a base station. The MSIF communication unit 810 sends the base station an overload control message including the preference priority information for overload control under the control of the MSIF control unit. The MSIF communication unit 810 sends the base station an overload stop message for terminating the overload control under the control of the MSIF control unit 820.

The MSIF control unit 820 controls the states and operations of all the components constituting the MSIF. Here, the MSIF control unit 820 may control the base station to control overload occurring in providing the service to the terminal. In order to accomplish this, the MSIF control unit 820 includes an overload control determiner 825 and a permitted priority information generator 827.

The overload control determiner 825 may check the overload level caused by the RRC connection requests transmitted by terminal through the base station. The overload control determiner 825 determines whether overload control is necessary based on the checked overload information. That is, the overload control determiner 825 checks whether the overload level is equal to or greater than a preconfigured threshold value to determine the necessity of the overload control for the service provided to the terminal currently.

The permitted priority information generator 827 checks the permitted priorities of individual services provided to the terminal and generates the permitted priority information. The permitted priority information is the information generated with an order of priorities of services to be provided to the terminal. The permitted priority information means the information including delay tolerant for Machine Type Communication (MTC) terminal, mo-Data for outgoing call service, mo-Signaling for voice service provided due to Circuit Switching (SC) fallback, high Priority Access for specific user, mt-Access 660 requesting for network for preference incoming call service, and emergency for emergency call service in an acceptable order thereof thereof.

If it is determined that overload control is necessary, the MSIF control unit 820 controls the MSIF communication unit 810 to send the base station the overload control message including the permitted priority information. The MSIF control unit 820 checks the RRC connection request message received by means of the MSIF communication unit 810. Next, the MSIF control unit 820 checks the overload level constantly based on the received RRC connection request messages. If the overload level drops to an extent requiring the overload control no longer, the MSIF control unit 820 controls the MSIF communication unit 810 to send the base station the overload stop message for terminating the overload control.

Figure 9:
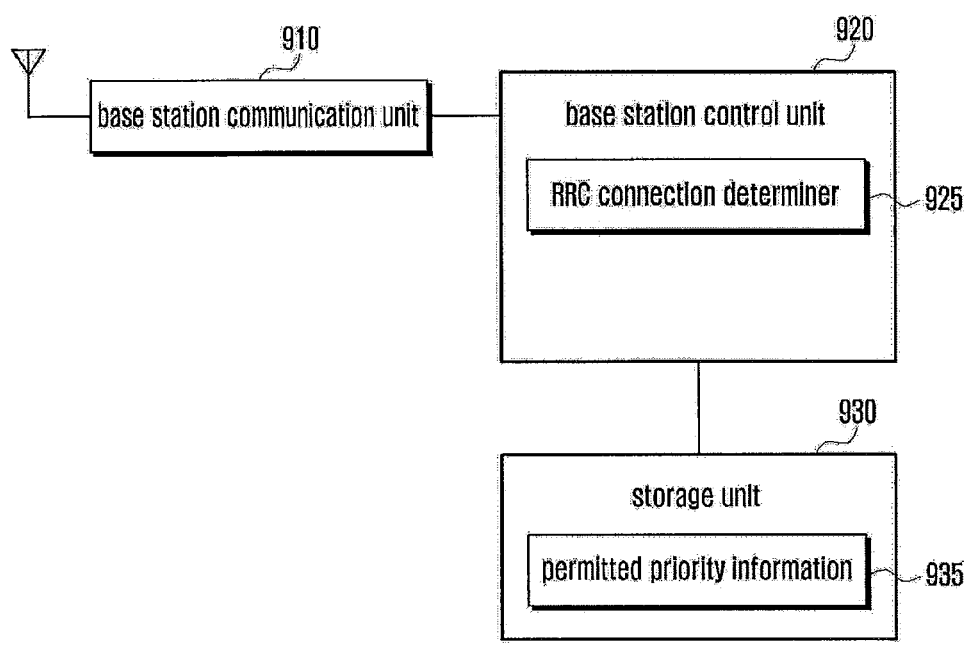
FIG. 9 is a block diagram illustrating a configuration of the base station according to an embodiment of the present disclosure.

FIG. 9 is a block diagram illustrating a configuration of the base station according to an embodiment of the present disclosure.

Referring to FIG. 9, the base station includes a base station communication unit 910 and a base station control unit 920.

The base station communication unit 910 relays data between the terminal and the MSIF. Here, the base station communication unit 910 receives the RRC connection request message transmitted by the terminal under the control of the base station control unit 920. The base station communication unit 910 receives the overload control message including the preference priority information for overload control or the overload stop message for terminating overload control from the MSIF under the control of the base station control unit 920. Next, the base station communication unit 910 sends the terminal the RRC connection accept message or the RRC connection reject message in response to the RRC connection request message under the control of the base station control unit 920.

The base station control unit 920 controls the states and operations of all the components constituting the base station. Here, the base station control unit 920 receives the overload control message, i.e. overload start message, from the MSIF by means of the base station communication unit 910. Then the base station control unit 920 checks the permitted priority information included in the overload control message.

If the RRC connection request message is received form the terminal by means of the base station communication unit 910, the base station control unit 920 checks the service information included in the RRC connection request message. The base station control unit 920 performs overload control according to the service information. For this purpose, the base station control unit 920 includes an RRC connection determiner 925.

The RRC connection determiner 925 compares the checked service information and the permitted priority information received from the MSIF. The RRC connection determiner 925 determines whether the permitted priority information includes the service information.

Depending on the determination result, the base station control unit 920 may determine whether to transmit RRC connection response message through the base station communication unit 910. If the permitted priority information includes the service information, the base station control unit 920 controls the base station communication unit 910 to send the terminal the RRC connection response message. Otherwise if the permitted priority information does not include the service information, the base station control unit 920 controls the base station communication unit 910 to send the terminal the RRC connection reject message.

The base station control unit 920 determines whether the overload stop message for terminating the overload control is received from the MSIF through the base station communication unit 910. If the overload stop message is received from the MSIF, the base station control unit 920 ends the overload control. That is, the base station control unit 920 performs overload control repeatedly according to the receipt of the overload control message, i.e. overload start and stop messages, from the MSIF through the base station communication unit 910.

The storage unit 930 stores the permitted priority information 935 received from the MSIF under the control of the base station control unit 920. The permitted priority information 935 is the information sorting out the services provided to the terminal by ARP value and arranging the services in an acceptable order thereof.

Through the above configuration, the MSIF is capable of controlling the overloads, per service, occurring in association with the services provided to the terminal via the base station. In more detail, the MSIF sends the base station the permitted priorities informations generated in association with the services provided to the terminal, and the base station stores the priority informations. If an RRC connection request message for a service is received from the terminal in the overload control process, the base station may check the priority of the corresponding service and send the RRC connection accept message depending on the check result.

Although the description has been made with reference to particular embodiments, the present disclosure can be implemented with various modifications without departing from the scope of the present disclosure. Thus, the present disclosure is not limited to the particular embodiments disclosed but will include the following claims and their equivalents.

The invention claimed is:

1. A method for a Radio Resource Control (RRC) connection by a base station in a wireless communication system, the method comprising:
   receiving, from a mobile management entity, an overload control message including preference priority information for controlling overload, wherein the preference priority information includes first mobile originating data (mo-data) for a first preference outgoing call service and second mobile mobile originating data (mo-data) for a second preference outgoing call service;
   a priority of the second mobile originating mobile originating data (mo-data) for the second preference outgoing call service being higher than a priority of the first mobile originating data (mo-data) for the first preference outgoing call;
   storing the preference priority information and receiving, from a terminal, an RRC connection request message including first service information for performing service;
   after receiving the RRC connection request message, determining the first service information corresponds to the second mobile originating data (mo-data) for the second preference outgoing call service; and
   transmitting, if the first service information corresponds to the second mobile originating data (mo-data) for the second preference outgoing call service, an RRC connection accept message to the terminal,
   wherein the preference priority information includes order of priority of delay tolerance for Machine Type Communication (MTC) terminal, mobile originating data (mo-data) for at least two outgoing call services, mobile originating signaling (mo-Signaling) for voice service provided due to Circuit Switching (SC) fallback, high Priority Access for specific user, mobile terminating access (mt-Access) requesting for a network for at least two incoming call services, and emergency for emergency call service.

2. The method of claim 1, further comprising:
   transmitting, if the first service information corresponds to the first mobile originating data (mo-data) for the first preference outgoing call service.

3. The method of claim 1, wherein the preference priority information is sorted based on Allocation and Retention Priority (ARP) values.

4. The method of claim 1, wherein the preference priority information includes a priority of a specific Non-Access Stratum (NAS) signaling from the terminal.

5. The method of claim 1, wherein the preference priority information defines NAS signaling for providing VoLTE service and RRC Establishment Cause.

6. A base station for a Radio Resource Control (RRC) connection in a wireless communication system, comprising:
   a transceiver configured to transmit and receive a signal;
   at least one processor coupled to the transceiver, wherein the at least one processor is configured to receive, from a mobile management entity, an overload control message including preference priority information for controlling overload, wherein the preference priority information includes first mobile originating data (mo-data) for a first preference outgoing call service and second mobile originating data (mo-data) for a second preference outgoing call service, a priority of the second mobile originating data (mo-data) for the second preference outgoing call service being higher than a priority of the first mobile originating data (mo-data) for the first preference outgoing call, to store the preference priority information and receive, from a terminal, an RRC connection request message including first service information for performing service, to determine whether the first service information corresponds to the second mobile originating data (mo-data) for the second preference outgoing call service after receiving the RRC connection request message, and to transmit, if the first service information corresponds to the second mobile originating data (mo-data) for the second preference outgoing call service, an RRC connection accept message to the terminal; and a memory coupled to the at least one processor, wherein the memory is configured to store the preference priority information, wherein the preference priority information includes order of priority of delay tolerance for Machine Type Communication (MTC) terminal, mobile originating data (mo-data) for at least two outgoing call services, mobile originating signaling (mo-Signaling) for voice service provided due to Circuit Switching (SC) fallback, high Priority Access for specific user, mobile terminating access (mt-Access) requesting for a network for at least two incoming call services, and emergency for emergency call service.

7. The base station of claim 6, wherein the at least one processor is further configured to transmit, if the first service information corresponds to the first mobile originating data (mo-data) for the first preference outgoing call service.

8. The base station of claim 6, wherein the preference priority information is sorted based on Allocation and Retention Priority (ARP) values.

9. The base station of claim 6, wherein the preference priority information includes priority of a specific Non-Access Stratum (NAS) signaling from the terminal.

10. The base station of claim 6, wherein the preference priority information defines NAS signaling for providing VoLTE service and RRC Establishment Cause.

* * * * *